US012782669B2

(12) United States Patent
Matsumoto

(10) Patent No.: US 12,782,669 B2
(45) Date of Patent: Nov. 3, 2026

(54) VEHICULAR IMAGING DEVICE

(71) Applicant: Panasonic Automotive Systems Co., Ltd., Kanagawa (JP)

(72) Inventor: Yasutaka Matsumoto, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 297 days.

(21) Appl. No.: 18/601,653

(22) Filed: Mar. 11, 2024

(65) Prior Publication Data

US 2024/0219675 A1 Jul. 4, 2024

Related U.S. Application Data

(63) Continuation of application No. PCT/JP2022/025413, filed on Jun. 24, 2022.

(30) Foreign Application Priority Data

Nov. 10, 2021 (JP) ................................ 2021-183721

(51) Int. Cl.

| | |
|---|---|
| ***G02B 7/02*** | (2021.01) |
| ***G03B 17/08*** | (2021.01) |
| ***G03B 17/55*** | (2021.01) |
| ***H04N 23/52*** | (2023.01) |

(52) U.S. Cl.

CPC ............. *G02B 7/028* (2013.01); *G03B 17/08* (2013.01); *G03B 17/55* (2013.01); *H04N 23/52* (2023.01)

(58) Field of Classification Search

CPC ......... G02B 7/028; G03B 17/55; H04N 23/52
USPC .......................................................... 359/820
See application file for complete search history.

(56) References Cited

U.S. PATENT DOCUMENTS

| | | | | |
|---|---|---|---|---|
| 8,207,489 B2 * | 6/2012 | Aiba | ...................... | H04N 23/54<br>348/335 |
| 11,366,282 B2 * | 6/2022 | Ding | ...................... | G02B 7/028 |
| 2014/0078386 A1 | 3/2014 | Chang | | |
| 2017/0223243 A1 | 8/2017 | Nakamura et al. | | |
| 2019/0163037 A1 * | 5/2019 | Koyama | ............... | B64U 20/87 |

(Continued)

FOREIGN PATENT DOCUMENTS

| | | |
|---|---|---|
| JP | H089208 A | 1/1996 |
| JP | H11341321 A | 12/1999 |

(Continued)

OTHER PUBLICATIONS

Decision to Grant a Patent, dated Jun. 10, 2025, for Japanese Patent Application No. 2021-183721. (3 pages)(with English Translation).

(Continued)

*Primary Examiner* — Bumsuk Won
*Assistant Examiner* — Seth D Moser
(74) *Attorney, Agent, or Firm* — Seed Intellectual Property Law Group LLP

(57) ABSTRACT

A vehicular imaging device according to an aspect of the present embodiment includes a lens barrel, a substrate, a housing, and a first heat dissipation member. The lens barrel accommodates a lens. A sensor that converts light received through the lens into an image signal is mounted on the substrate. The housing accommodates the lens barrel and the substrate. The first heat dissipation member is disposed between a lens barrel and a housing, and thermally connects the lens barrel and the housing.

9 Claims, 3 Drawing Sheets

(56) References Cited

U.S. PATENT DOCUMENTS

| | | | | |
|---|---|---|---|---|
| 2022/0030150 | A1* | 1/2022 | Obana | G03B 17/55 |
| 2022/0159158 | A1* | 5/2022 | Smirnov | G02B 13/16 |
| 2023/0244128 | A1* | 8/2023 | Van Den Brink | H05B 3/84 359/820 |
| 2023/0353850 | A1* | 11/2023 | Endo | H04N 23/52 |
| 2024/0214656 | A1* | 6/2024 | Tanaka | H04N 23/52 |
| 2025/0211841 | A1* | 6/2025 | Noda | H04N 23/52 |
| 2026/0143215 | A1* | 5/2026 | Abe | H04N 23/52 |

FOREIGN PATENT DOCUMENTS

| | | | | |
|---|---|---|---|---|
| JP | 2006349752 | A | 12/2006 | |
| JP | 2008046169 | A | 2/2008 | |
| JP | 2012215713 | A | 11/2012 | |
| JP | 5685625 | B2 | 3/2015 | |
| JP | 2018194594 | A | 12/2018 | |
| JP | 2019168509 | A | 10/2019 | |
| JP | 2019192813 | A | 10/2019 | |
| JP | 2020144307 | A | 9/2020 | |
| JP | 2021048540 | A * | 3/2021 | H04N 23/51 |
| JP | 2021152609 | A | 9/2021 | |
| WO | 2016017682 | A1 | 2/2016 | |

OTHER PUBLICATIONS

English Translation of International Search Report dated Aug. 2, 2022, for the corresponding International Patent Application No. PCT/JP2022/025413, 3 pages.

* cited by examiner

VEHICULAR IMAGING DEVICE

CROSS-REFERENCE TO RELATED APPLICATIONS

This application is a continuation of International Application No. PCT/JP2022/025413, filed on Jun. 24, 2022 which claims the benefit of priority of the prior Japanese Patent Application No. 2021-183721, filed on Nov. 10, 2021, the entire contents of which are incorporated herein by reference.

FIELD

The present disclosure relates to a vehicular imaging device.

BACKGROUND

In recent years, with the spread of driving assistance systems for vehicles, cameras are increasingly mounted on vehicles. In addition, since a clearer image is required for an image captured by a camera (hereinafter, also referred to as an in-vehicle camera) mounted on a vehicle, the number of pixels of an image sensor (hereinafter, also simply referred to as a sensor) included in an in-vehicle camera tends to increase.

Meanwhile, as the number of pixels increases, the amount of heat dissipation from the sensor increases, and thus the temperature of the in-vehicle camera tends to increase. When the internal temperature of the in-vehicle camera rises, the temperature difference between the internal temperature of the in-vehicle camera and the outside air becomes larger, so that dew condensation may occur in the lens exposed to the outside. In the related art, an O-ring is disposed in a gap between a lens and a lens barrel or sealed the gap with an adhesive to enhance airtightness against outside air and prevent dew condensation (for example, Japanese Patent No. 5685625).

SUMMARY

DETAILED DESCRIPTION

A vehicular imaging device according to an aspect of the present embodiment includes a lens barrel, a substrate, a housing, and a first heat dissipation member. The lens barrel accommodates a lens. A sensor that converts light received through the lens into an image signal is mounted on the substrate. The housing accommodates the lens barrel and the substrate. The first heat dissipation member is disposed between the lens barrel and the housing, and thermally connects the lens barrel and the housing.

Hereinafter, embodiments of the present disclosure will be described in detail with reference to the drawings as appropriate. However, unnecessarily detailed description may be omitted. Note that the accompanying drawings and the following description are provided for those skilled in the art to fully understand the present disclosure, and are not intended to limit the subject matter described in the claims.

First Embodiment

The vehicular imaging device according to the first embodiment is, for example, an in-vehicle camera that is mounted on a vehicle and can be used for driving assistance for the vehicle. A vehicular imaging device for driving assistance detects an object such as a vehicle, a pedestrian, or an obstacle by image processing using an internal image signal processor (ISP), and plays a major role in a driving assistance system of the vehicle such as giving a warning to a driver or forcibly stopping the vehicle.

Figure 1:
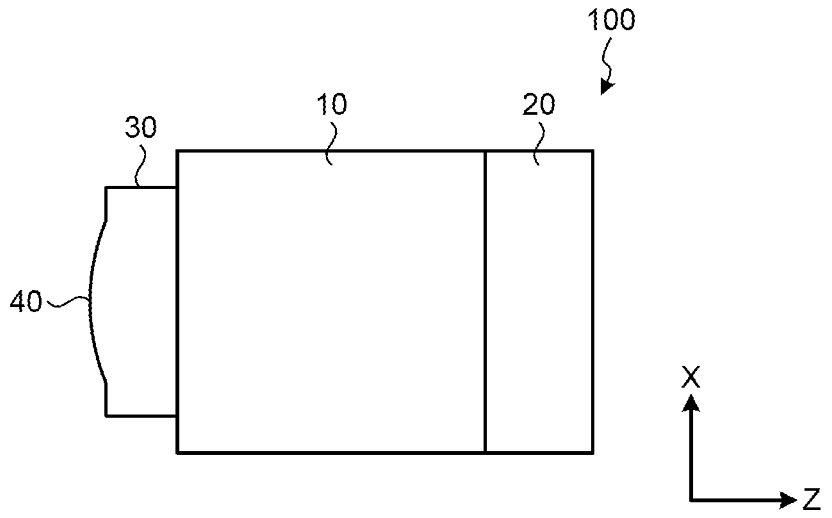
FIG. 1 is a view illustrating an example of an external view of a vehicular imaging device according to a first embodiment.
Figure 2:
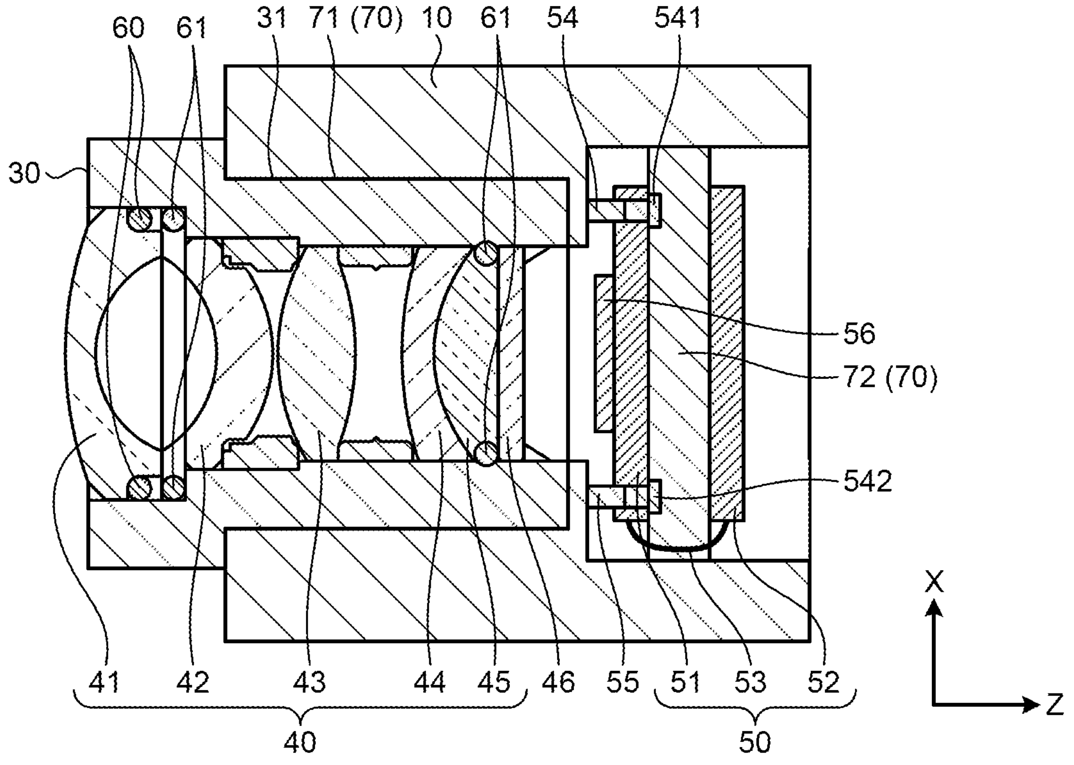
FIG. 2 is a view illustrating an example of a longitudinal cross-sectional view of the vehicular imaging device according to the first embodiment.

FIG. 1 is an external view of a vehicular imaging device 100 according to the first embodiment. FIG. 2 is a longitudinal cross-sectional view of the vehicular imaging device 100 according to the first embodiment.

In the drawings described below, an X axis and a Z axis orthogonal to each other are illustrated for convenience, and a vertical direction (X direction) and a horizontal direction (Z direction) in the vehicular imaging device 100 of the embodiment will be described using the X axis and the Z axis. In the following description, when simply described as the X direction or the Z direction, the X direction and the Z direction are axial directions, and include two opposite directions.

In addition, when the positive direction of the X axis is specified, the direction is one direction from the lower side to the upper side, and when the positive direction of the Z axis is specified, the direction is one direction from the left side to the right side. When the negative direction of the X axis is specified, the direction is one direction from the upper side to the below side, and when the negative direction of the Z axis is specified, the direction is one direction from the right side to the left side.

The vehicular imaging device 100 according to the first embodiment includes a first housing 10, a second housing 20, a lens barrel 30, a lens 40, an infrared rays (IR) cut filter 46, a substrate 50, a first fixing member 54, a second fixing member 55, and a sensor 56.

The first housing 10 and the second housing 20 are made of a conductive material such as metal. The first housing 10 and the second housing 20 are made of, for example, aluminum die-casting (as an example, an aluminum alloy such as ADC 12) or the like. The first housing 10 and the second housing 20 accommodate a part of the lens barrel 30 and the substrate 50 inside a space formed by combining the first housing 10 and the second housing 20.

The lens barrel 30 is a cylindrical member whose both ends are opened. The lens barrel 30 is formed of, for example, a member having moisture absorbency such as resin. A part of the lens barrel 30 is accommodated in a recess 31 in a recessed form disposed in the first housing 10. More specifically, the lens barrel 30 is accommodated in the recess 31 of the first housing 10 in a state where the distal end portion (first lens 41 side) of the lens barrel 30 is exposed. Note that the recess 31 of the lens barrel 30 has a shape corresponding to the diameter of the lens barrel 30.

In addition, the lens 40 and the IR cut filter 46 are arranged at predetermined positions inside the lens barrel 30. Specifically, in the lens barrel 30, a first lens 41, a second lens 42, a third lens 43, a fourth lens 44, a fifth lens 45, and an IR cut filter 46, which will be described later, are arranged in order of incidence on the lens barrel 30.

The lens 40 includes the first lens 41, the second lens 42, the third lens 43, the fourth lens 44, and the fifth lens 45. The lens 40 is made of plastic, glass, or the like. In addition, air is held between the lenses of the lens 40 accommodated in the lens barrel 30. Note that the number of lenses 40 is not limited thereto.

The IR cut filter 46 cuts infrared rays incident from the lens 40 and transmits only visible light to a sensor 56 described later. Note that the configurations of the lens barrel 30, the lens 40 disposed inside the lens barrel 30, and the IR cut filter 46 are also collectively referred to as a lens unit.

The substrate 50 is accommodated inside a space formed by the first housing 10 and the second housing 20. The substrate 50 includes a first substrate 51, a second substrate 52, and a flexible wiring 53 described later. A sensor 56 to be described later that captures a subject image formed on an imaging surface by the lens 40 is mounted on the substrate 50.

The first substrate 51 is a substrate 50 on which the sensor 56 to be described later is mounted. The first substrate 51 is the substrate 50 fixed to the first housing 10 via the first fixing member 54 and the second fixing member 55. The second substrate 52 is a substrate 50 having a mounting substrate connector into which an output mechanism (not illustrated) is fitted, and electrically connected to first substrate 51 via the flexible wiring 53. The flexible wiring 53 is a wiring that electrically connects the first substrate 51 and the second substrate 52.

The first fixing member 54 and the second fixing member 55 are, for example, screws made of a metal material (as an example, stainless steel) or the like, and fix the first substrate 51 to the first housing 10. Specifically, the first fixing member 54 and the second fixing member 55 are inserted from the first housing 10 into a hole disposed in the first substrate 51 to fix the first substrate 51 to the first housing 10.

The method for fixing the first substrate 51 is not particularly limited, and the first substrate may be fixed using, for example, an adhesive. In the case of using the adhesive, for example, the UV temporary hard adhesive is applied (filled) to a first tray 541 in contact with the first fixing member 54 disposed on the first substrate 51 and a second tray 542 in contact with the second fixing member 55. Next, after an arrangement position and an arrangement angle of the first substrate 51 are adjusted with respect to the lens barrel 30, curing of the adhesive is performed.

The sensor 56 is mounted on the first substrate 51. The sensor 56 is an imaging element, for example, a complementary metal oxide semiconductor (CMOS) image sensor. The sensor 56 receives light passing through the lens 40 and the IR cut filter 46 in the lens barrel 30, forms an image of the received light, and converts the image into an image signal. The sensor 56 is disposed on the optical axes of the lens barrel 30 and the lens 40. In addition, the sensor 56 generates heat when the sensor 56 operates. That is, the sensor 56 is a generation source that generates heat.

A sealing member 60 is disposed between the lens barrel 30 and the first lens 41. The sealing member 60 is, for example, an O-ring. The vehicular imaging device 100 has a waterproof function by disposing the sealing member 60.

A sealing agent 61 is disposed between the first lens 41 and the second lens 42. The sealing agent 61 is, for example, a resin such as an adhesive, and more preferably, an ultraviolet curable resin or the like is used. Since the sealing structure is formed by the sealing agent 61 and the second lens 42, it is possible to block the inflow of the fluid from the second lens 42 side to the first lens 41 side (negative Z-axis direction).

The sealing agent 61 is disposed between the fifth lens 45 and the IR cut filter 46. Since the sealing structure is formed by the sealing agent 61 and the IR cut filter 46, it is possible to block the inflow of the fluid from the IR cut filter 46 side to the fifth lens 45 side (negative Z-axis direction). The fluid is, for example, high temperature and high humidity air. The sealing structure may be a heat insulating structure.

By the way, in the above configuration, the sensor 56 generates heat by the operation of the vehicular imaging device 100. When the sensor 56 generates heat, the temperature inside the first housing 10 rises. When the internal temperature of the first housing 10 rises, the temperature difference between the internal temperature of the first housing 10 and the outside air becomes larger, so that dew condensation may occur in the lens 40 exposed to the outside. Note that the sealing member 60 and the sealing agent 61 described above can enhance airtightness of the vehicular imaging device 100 with respect to outside air, but cannot block heat inside the first housing 10, and there is room for further improvement.

Therefore, the vehicular imaging device 100 of the first embodiment has the following configuration in order to reduce dew condensation on the lens 40 due to the temperature difference between the first housing 10 and the lens barrel 30 described above.

The vehicular imaging device 100 of the first embodiment includes a first heat dissipation member 71. The first heat dissipation member 71 is formed of a member having thermal conductivity (for example, a heat dissipation sheet, heat dissipation grease, and the like).

The first heat dissipation member 71 is disposed between the first housing 10 and the lens barrel 30. Specifically, the first heat dissipation member 71 is disposed between the recess 31 of the first housing 10 and the outer peripheral surface of the lens barrel 30, and thermally connects the first housing 10 and the lens barrel 30. For example, the first heat dissipation member 71 is disposed (wound) along the outer peripheral surface of the lens barrel 30. In the lens barrel 30, by disposing the first heat dissipation member 71 between the first housing 10 and the lens barrel 30, heat from the inside of the first housing 10 is conducted to the outer peripheral surface of the lens barrel 30 via the first heat dissipation member 71. As the heat is conducted, a temperature difference between the inside of the first housing 10 and the inside of the lens barrel 30 is less likely to occur.

As a result, in the first heat dissipation member 71, the temperature difference between the inside of the first housing 10 and the inside of the lens barrel 30 can be reduced and made substantially uniform. Therefore, the vehicular imaging device 100 can reduce dew condensation on each lens 40 accommodated in the lens barrel 30. The first heat dissipation member 71 may be disposed on the bottom surface of the recess 31 of the first housing 10.

Furthermore, the vehicular imaging device 100 of the first embodiment further includes a second heat dissipation member 72. The second heat dissipation member 72 is disposed between the first substrate 51 and the second substrate 52.

Specifically, the second heat dissipation member 72 is disposed between a back surface of a substrate surface of the first substrate 51 on which the sensor 56 is mounted and a back surface of a mounting substrate connector to which an output mechanism of the second substrate 52 is fitted, and thermally connects the first substrate 51 and the second substrate 52.

Further, the second heat dissipation member 72 contacts with a side surface of the first housing 10. Specifically, the second heat dissipation member 72 contacts the inner peripheral side surface and the inner peripheral bottom surface of the first housing 10 inside the space formed by the first housing 10 and the second housing 20 in which the substrate 50 (the first substrate 51 and the second substrate 52) is accommodated, and thermally connects the first housing 10 and the substrate 50.

The second heat dissipation member 72 is formed of a member having thermal conductivity (for example, heat dissipation grease, heat dissipation silicon, and the like). For example, when the second heat dissipation member 72 is a two-liquid mixed type heat dissipation grease, the second heat dissipation member becomes a liquid with high viscosity during a pot life after mixing the two liquids, and thus can cope with various shapes such as a slight gap between electronic components mounted on the substrate 50. Note that the first heat dissipation member 71 and the second heat dissipation member 72 are also collectively referred to as a heat dissipation member 70.

Figure 3:
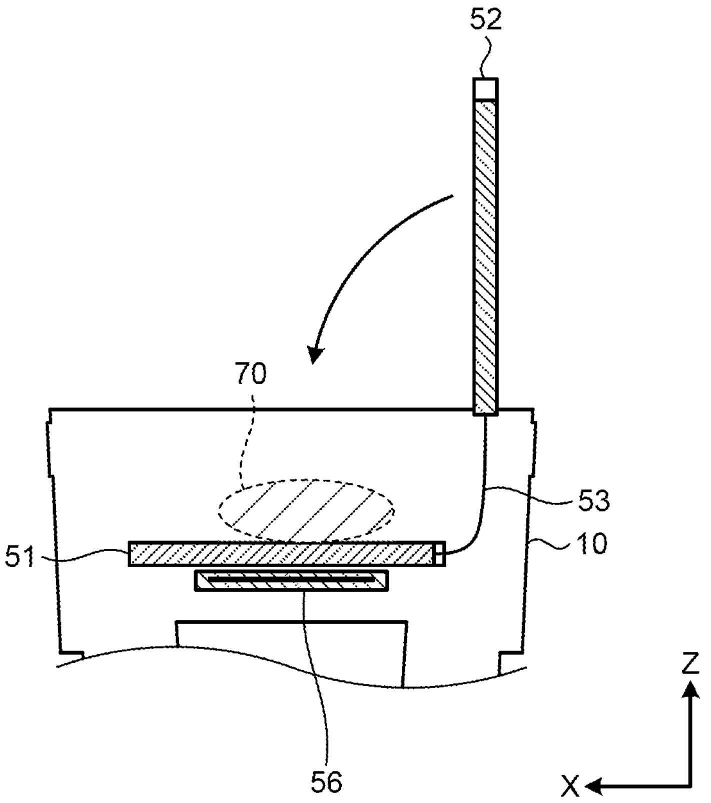
FIG. 3 is a view illustrating an example of a schematic diagram in the middle of assembly inside the vehicular imaging device according to the first embodiment.

Here, a method of disposing the second heat dissipation member 72 on the first substrate 51 and the second substrate 52 will be described with reference to FIG. 3. FIG. 3 is a view illustrating an example of a schematic diagram in the middle of assembly inside the vehicular imaging device 100 according to the first embodiment. In the present example, a case where a two-liquid mixed type heat dissipation grease is used as the second heat dissipation member 72 will be described.

First, the heat dissipation grease is applied to the center of the first substrate 51 on the opposite side of the substrate surface (hereinafter, also referred to as back surface) on which the sensor 56 is mounted. Thereafter, the second substrate 52 is pressed from above so as to sandwich the heat dissipation grease applied to the back surface of the first substrate 51 with the first substrate 51, thereby bringing the first substrate 51 and the second substrate 52 into close contact with each other.

When the second substrate 52 is pressed from above, the heat dissipation grease flows into the gap between the first substrate 51 and the second substrate 52 and reaches the wall surface (the inner peripheral side surface and the inner peripheral bottom surface) of the first housing 10 flowing out of the gap. Thereafter, the heat dissipation grease is naturally cured, whereby thermal connection between the first substrate 51 and the first housing 10 is held by the heat dissipation grease (heat dissipation member 70).

When the second heat dissipation member 72 contacts the side surface of the first housing 10, heat from the sensor 56 is conducted to the side surface of the first housing 10 via the second heat dissipation member 72. As the heat is conducted, a temperature difference between the inside of the first housing 10 and the sensor 56 is less likely to occur. As a result, the second heat dissipation member 72 can equalize the temperature of the inside of the first housing 10 and the sensor 56.

As described above, in the vehicular imaging device 100 of the first embodiment, the heat dissipation member 70 is disposed between the first housing 10 and the lens barrel 30, so that heat from the first housing 10 is conducted to the lens barrel 30. As a result, in the vehicular imaging device 100 of the first embodiment, it is possible to eliminate the temperature difference between the inside of the first housing 10 and the inside of the lens barrel 30, and thus, it is possible to reduce fogging of the lens 40. Therefore, the vehicular imaging device 100 of the first embodiment can reduce the occurrence of dew condensation on the lens 40.

Furthermore, in the vehicular imaging device 100 of the first embodiment, by disposing the heat dissipation member 70 between the first substrate 51 and the second substrate 52, heat generated by the sensor 56 is conducted to the first housing 10. As a result, in the vehicular imaging device 100 of the first embodiment, since the temperature difference between the first housing 10 and the sensor 56 can be reduced, the temperature difference between the inside of the first housing 10 and the inside of the lens barrel 30 can be reduced.

Second Embodiment

Figure 4:
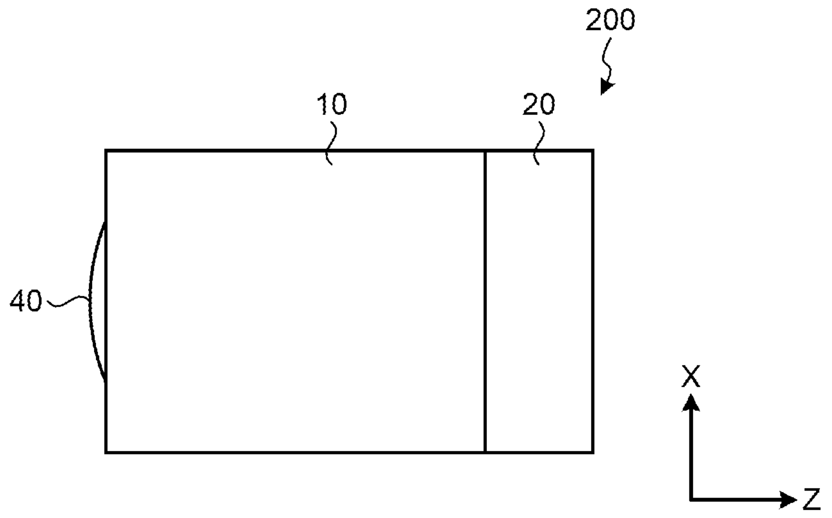
FIG. 4 is a view illustrating an example of an external view of a vehicular imaging device according to a second embodiment.
Figure 5:
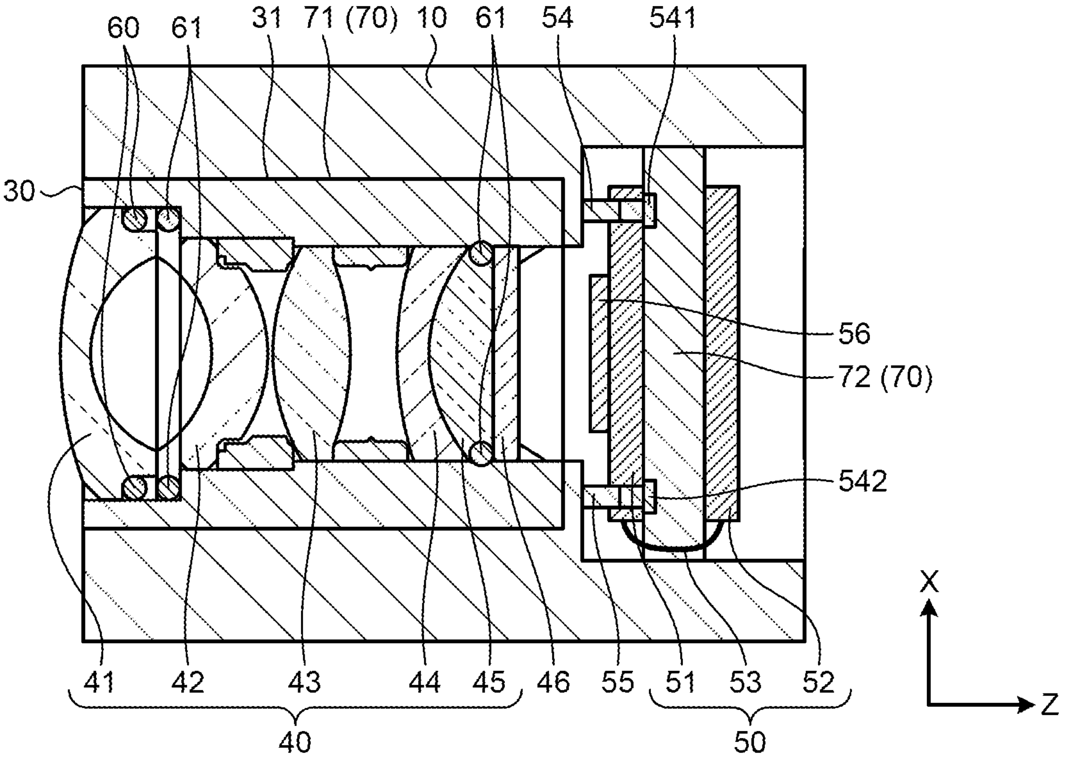
FIG. 5 is a view illustrating an example of a longitudinal cross-sectional view of the vehicular imaging device according to the second embodiment.

Next, a second embodiment will be described. FIG. 4 is an external view of a vehicular imaging device 200 according to the second embodiment. FIG. 5 is a longitudinal cross-sectional view of the vehicular imaging device 200 according to the second embodiment. Description of parts common to those of the above-described first embodiment will be omitted as appropriate. Note that constituent elements similar to those in the first embodiment are denoted by the same reference numerals, and description thereof will be omitted as appropriate.

In the above-described first embodiment, a case in which a part of the lens barrel 30 is accommodated in the recess 31 of the first housing 10 has been described. In the second embodiment, an explanation will be given on a case in which the entire of the lens barrel 30 is accommodated in a recess of the first housing 10.

A recess 32 of the first housing 10 accommodates the entire lens barrel 30. In the lens barrel 30 accommodated in the recess 32, the distal end portion of the first housing 10 and the distal end portion of the lens barrel 30 are at substantially the same position in the optical axis direction (on the Z-axis) of the lens barrel 30. That is, the distal end portion of the first housing 10 and the distal end portion of the lens barrel 30 overlap each other. Here, a state in which the lens barrel 30 is accommodated in the first housing 10 will be described with reference to FIG. 5.

As illustrated in FIG. 5, the entire lens barrel 30 is accommodated in the recess 32 of the first housing 10. Since the entire lens barrel 30 is accommodated in the recess 32 of the first housing 10, the contact area between the first housing 10 and the lens barrel 30 can be further increased. As a result, an exposed portion of the lens unit (a portion not accommodated in the first housing 10) is reduced, so that it is hardly affected by the temperature from the exposed portion of the lens unit.

That is, the heat dissipation member 70 can conduct heat from the first housing 10 to the entire lens barrel 30. As a result, in the vehicular imaging device 200 of the second embodiment, the temperature difference between the first housing 10 and the inside of the lens barrel 30 can be more efficiently reduced. Therefore, the vehicular imaging device 200 of the second embodiment can more efficiently reduce dew condensation on the lens 40.

Note that the above-described embodiment can be appropriately modified and implemented by changing a part of the configuration or function of the device described above.

Therefore, in the following, some modifications according to the above-described embodiment will be described as other embodiments. In the following description, points different from the above-described embodiment will be mainly described, and detailed description of points common to the contents already described will be omitted. In addition, the modifications described below may be implemented individually, or may be implemented in appropriate combination.

Modifications

In the above embodiment, the number of the substrates 50 has been described as two, but the present invention is not limited thereto. For example, the number of substrates 50 may be one or three or more. That is, regardless of the number of the substrates 50, the heat dissipation member 70 may be disposed on the substrate 50.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A vehicular imaging device comprising:

a lens barrel that has an inner surface and an outer surface, and accommodates a lens;

a sensor that converts light received through the lens into an image signal;

a substrate on which the sensor is mounted;

a housing that has an inner peripheral side surface and an outer peripheral side surface, and accommodates the lens barrel and the substrate; and a first heat dissipation member that is a heat dissipation sheet and is disposed between the outer surface of the lens barrel and the inner peripheral side surface of the housing, and thermally connects the lens barrel and the housing, the first heat dissipation member is wound along the outer surface of the lens barrel, and is in contact with the outer surface of the lens barrel and the inner peripheral side surface of the housing.

2. The vehicular imaging device according to claim 1, wherein a first distal end portion of the lens barrel is exposed from the housing.

3. The vehicular imaging device according to claim 2, wherein a second distal end portion of the lens barrel opposite to the first distal end portion overlaps a distal end portion of the housing.

4. The vehicular imaging device according to claim 1, further comprising a second heat dissipation member that thermally connects the substrate and the housing.

5. The vehicular imaging device according to claim 4, wherein the substrate has a first surface and a second surface opposite to the first surface, the sensor is mounted on the first surface of the substrate, the second heat dissipation member is disposed on the second surface of the substrate, at least part of the second heat dissipation member is in contact with the inner peripheral side surface of the housing.

6. The vehicular imaging device according to claim 1, wherein the lens barrel is made of resin, and the housing is made of metal.

7. A vehicular imaging device comprising:

a lens barrel that has an inner surface and an outer surface, and accommodates at least one lens;

a first substrate having a first surface and a second surface opposite to the first surface;

an imaging element that converts light received through the at least one lens into an image signal and is arranged on the first surface of the first substrate;

a housing that has an inner peripheral side surface and an outer peripheral side surface, and accommodates a part of the lens barrel and the first substrate;

a first heat dissipation member that is a heat dissipation sheet and is in contact with the outer surface of the lens barrel and the inner peripheral side surface of the housing, and thermally connects the lens barrel and the housing;

a second heat dissipation member that thermally connects the first substrate and the housing, wherein the second heat dissipation member is in contact with the second surface of the first substrate and the inner peripheral side surface of the housing.

8. The vehicular imaging device according to claim 7, further comprising a second substrate having a third surface facing the second surface of the first substrate and a fourth surface opposite to the third surface, wherein the second heat dissipation member is in contact with the third surface of the second substrate.

9. The vehicular imaging device according to claim 7, wherein the lens barrel is made of resin, and the housing is made of metal.

* * * * *